J. C. W. HUMFREY.
NOTCHED BAR TESTING MACHINE.
APPLICATION FILED NOV. 25, 1919.

1,356,821.  Patented Oct. 26, 1920.

INVENTOR:
John C. W. Humfrey
By Wm Wallace White
ATTY.

UNITED STATES PATENT OFFICE.

JOHN CHARLES WILLIS HUMFREY, OF LONDON, ENGLAND.

NOTCHED-BAR-TESTING MACHINE.

1,356,821.     Specification of Letters Patent.     Patented Oct. 26, 1920.

Application filed November 25, 1919. Serial No. 340,560.

*To all whom it may concern:*

Be it known that I, JOHN CHARLES WILLIS HUMFREY, a subject of the King of Great Britain and Ireland, residing at 40 Grosvenor Gardens, London S. W. 1, England, have invented new and useful Improvements in Notched-Bar-Testing Machines, of which the following is a specification.

This invention relates to testing machines for use in testing notched bars such as are usually broken in machines of the Izod or Charpy type and my invention consists in an improved construction of machine which is capable of producing upon a chart during a test a continuous auto-graphic curve expressing the relation at any moment between the bending moment applied to the test piece or specimen, and the angular distortion which the bending moment produces in it; and further my improved machine is provided with apparatus for directly and visually indicating on a graduated dial, the energy expended in bending or breaking the test piece.

My invention will be better understood on reference to the accompanying sheet of drawings in which:—

Figure 1:
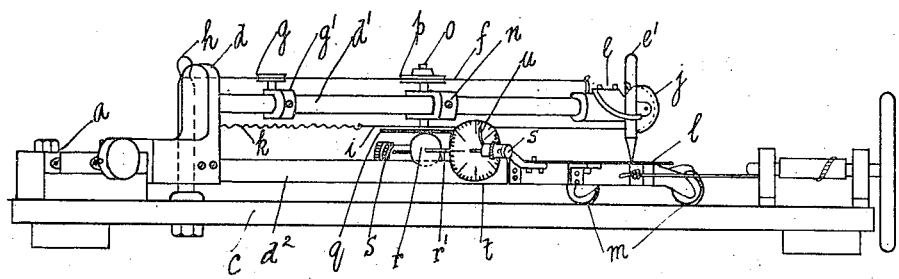
Figure 2:
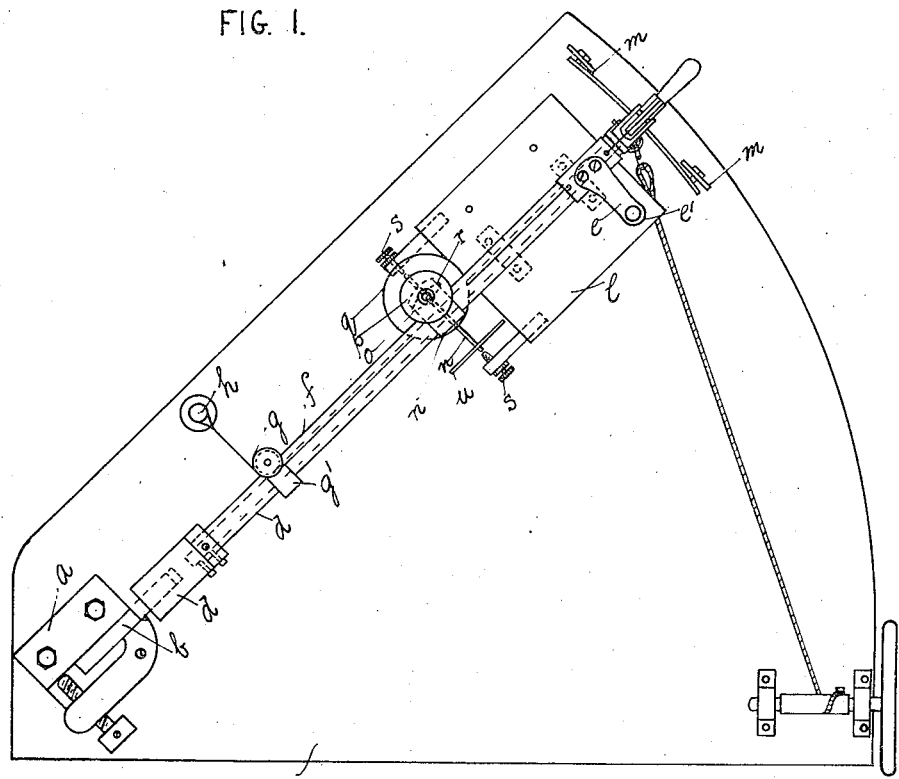

Figure 1 is a front elevation of my improved testing machine, and Fig. 2 is a plan view of same.

The same letters refer to similar parts in both views.

According to my invention I construct my improved machine with two principal parts, the first being a vise $a$ of any suitable form for holding the test piece $b$ the said vise $a$ being mounted upon a table or bed plate $c$ and the second being a special form of lever by which a bending moment can be applied to the test piece. The test piece $b$ is placed in the vise $a$ so that it is gripped up to the center line of the notch, the longitudinal axis of the test piece being horizontal and the notched face being vertical.

The special form of lever above mentioned consists of three principal parts, viz, an L shaped socket $d$ recessed or slotted to receive the projecting end of the test piece $b$; a rigid (preferably tubular) bar $d^1$ secured to the upper end of the L shaped socket $d$ and a flexible spring steel bar $d^2$ attached to the lower portion of the socket $d$.

The flexible bar $d^2$ is of such dimensions that if a force is applied at its free end at right angles to its length sufficient to break the test piece $b$ through the notch, a definite measurable deflection is produced along it, but it is nowhere stressed above its elastic limit.

The rigid tubular bar $d^1$ has mounted upon it a pen carriage capable of sliding smoothly along it. To one end of the pen carriage $e$ is attached a flexible wire $f$ which passes at right angles around a horizontally placed pulley $g$ mounted on a bracket $g^1$ near the socket end of the rigid bar $d^1$ and is secured to a fixed point $h$ on the bed plate $c$. To the other end of the pen carriage $e$ is attached another flexible wire $i$ which passes around a vertically placed pulley $j$ on the end of the rigid bar $d^1$ and then underneath it and secured to an elastic cord or spring $k$ anchored to the socket $d$. By this arrangement any angular displacement of the test piece $b$ causes the pen carriage $e$ to move a proportional distance along the bar $d^1$.

The flexible spring steel bar $d^2$ has secured to it a table $l$ upon which are placed the sheets or cards to receive the autographic records. A pen $e^1$ carried in the pen carriage $e$ has its point resting upon this last named table $l$. The flexible bar $d^2$ is supported at its free end upon small wheels $m$ or by a distance piece or pieces sliding over the base plate $c$.

On the rigid bar $d^1$ I secure a bearing $n$ in which is free to move, a vertical shaft $o$ having on the upper end a grooved pulley $p$ around which passes the cord $i$ actuating the pen carriage $e$. By these means the vertical shaft $o$ is turned during the test through an angle proportional to that through which the test piece $b$ bends. On the lower end of this vertical shaft $o$ is mounted a horizontal disk wheel $q$ which in turn rests upon the edge of an upright wheel $r$ supported on a shaft $r^1$ placed at any convenient angle to the flexible bar $d^2$ and carried in brackets $ss$ from the table $l$ attached to said bar $d^2$. On the last mentioned horizontal shaft $r^1$ is also mounted a graduated dial $t$ which rotates with the shaft, and the extent of which rotation is indicated by means of a stationary pointer $u$ placed on any convenient adjacent fixture. Alternatively the pointer may revolve with the shaft and the dial be stationary.

The procedure in carrying out a test with my improved machine is as follows:—

The test piece $b$ is firmly fastened in the vise $a$ so that the bottom of the notch is in line with the exterior face of the jaws as shown in Fig. 2. The socket end $d$ of the lever $d^2$ is fitted over the protruding end of the test piece $b$ to a distance from the vise $a$ which can be kept constant for all tests by means of a suitable gage. Force is then applied to the end of the flexible bar $d^2$, and for this purpose a chain and winch are shown in the accompanying drawings. The flexible bar $d^2$ is bent by this force, and thus causes the table $l$ to move relatively to the pen $e^1$ through an arc whose length is proportional to the force applied. At the same time any angular distortion of the test piece $b$ produced by the force causes the pen carriage $e$ to move along the rigid bar $d^1$ and thus tend to draw a straight line on the card approximately in the direction of the radius to the arc. A curve is thus described from which a full history of the test can be observed and the details of the various factors determined; the area inclosed by the curve being proportional to the work done. The preliminary standardization of the flexible bar $d^2$ is easily obtained by hanging on known weights and measuring the deflections produced by them.

When no bending moment is being applied to the test piece $b$ the wheel $r$ on the horizontal shaft $r^1$ is immediately under the center of the horizontal disk $q$ on the vertical shaft $o$. When load is applied, the wheel $r$ on the horizontal shaft $r^1$ moves away from the center of the horizontal disk wheel $q$ (the said movement being of course in unison with the flexible spring steel bar $d^2$) and thus any rotation of the vertical shaft $o$ by the movement of the cord $f$ over the pulley $p$ tends to revolve the horizontal shafts $r^1$ by the friction between the wheels $q$ and $r$ on the respective shafts $o$ and $r^1$. The extent of the rotation of the horizontal shaft $r^1$ during a test is governed at each instant partly by the rotation of the vertical shaft $o$ (i. e. due to the bending of the test piece $b$), and partly by the deflection of the flexible bar $d^2$ carrying the horizontal shaft $r^1$ (i. e. by the bending moment applied to the test piece). The total rotation at any instant of the test is proportional to the integral of these two factors, i. e. to the work expended. The before mentioned rotating graduated dial $t$ with its complementary fixed pointer $u$ shows the extent of the rotation which by means of the graduations on the dial $t$ is also expressed in terms of work done.

From the foregoing it will be understood that with my improved testing machine the energy applied moment by moment during the test is visually indicated by means of the graduated dial and pointer, while at the same time a graph is plotted out by the pen in the pen carriage, forming a permanent record of the test of the work performed during the operation.

While primarily intended for slow testing, it having been demonstrated by several investigators that such slow tests on notched bars give results of equal value with impact tests, my improved machine with a few modifications can also be used for very rapid tests.

I am aware that it has hitherto been proposed in metal bend testing machines to hold one end of the test piece in a fixed clamp or vise, and the other end in a socket on a movable but rigid member to which is pivoted a rigid operating handle with opposed lateral springs on either side, bearing against abutments on the rigid member or alternatively the handle itself is a spring and likewise the said rigid arm carries a chart table and the flexible handle carries a pencil to mark thereon. Also it has been proposed in a metal bend testing machine for the vise to be movable laterally against the pressure of coiled springs and for the movement of the vise due to the stressing of the test-piece, to be recorded on a chart by means of a spring actuated or weight controlled pencil carriage connected to the said vise. The above described arrangements however appertain to the breaking of test pieces, which are not notched, by means of a series of deflections to either side of the original axis, and no provision is made as in my invention for breaking a notched test piece by means of a single deflection in one direction only, and at the same time recording autographically in a single continuous curve the exact relation between the bending moment applied to the test piece and the angular distortion which this bending moment produces at each stage of the test, starting from the original application of the load up to the maximum bending moment required, and from thence down to the point at which the test piece completely fractures through the notch.

Having now described my invention what I claim as new and desire to secure by Letters Patent is:—

1. A notched bar testing machine having a vise mounted on a bed plate, an L shaped socket fitted with a rigid bar and a flexible bar, a pen carriage and pen slidably mounted on the rigid bar and controlled in its movements by a spring and cords passing over pulleys, a chart table secured to the flexible bar, and means for actuating the lever substantially as herein described.

2. A notched bar testing machine having a vise mounted on a bed plate, an L shaped socket fitted with a rigid and flexible bar, a controlled sliding pen carriage and pen mounted on the rigid bar, a chart table secured to the flexible bar, also a bearing on the rigid bar carrying a vertical shaft with upper grooved cord pulley and lower horizontal disk wheel resting on an upright wheel carried in a horizontal shaft supported in bearings from the chart table, said shaft also carrying a graduated dial with coöperating pointer, substantially as herein described.

In testimony whereof I have signed my name to this specification.

JOHN CHARLES WILLIS HUMFREY.